(12) United States Patent
Roth et al.

(10) Patent No.: US 8,110,154 B2
(45) Date of Patent: Feb. 7, 2012

(54) EXHAUST TREATMENT DEVICE WITH SENSOR AND METHOD OF MAKING

(75) Inventors: Gregory T. Roth, Davison, MI (US); Edward A. Owezarch, Troy, MI (US); Robert A. Sarsfield, Grand Blanc, MI (US)

(73) Assignee: Katcon Global S.A., Luxembourg (LU)

( * ) Notice: Subject to any disclaimer, the term of this patent is extended or adjusted under 35 U.S.C. 154(b) by 1363 days.

(21) Appl. No.: 11/669,761

(22) Filed: Jan. 31, 2007

(65) Prior Publication Data

US 2007/0178026 A1    Aug. 2, 2007

Related U.S. Application Data

(60) Provisional application No. 60/764,304, filed on Feb. 1, 2006.

(51) Int. Cl.
*B01D 50/00* (2006.01)
(52) U.S. Cl. ....................................................... 422/180

(58) Field of Classification Search .................. 422/179, 422/180
See application file for complete search history.

(56) References Cited

U.S. PATENT DOCUMENTS

| | | | |
|---|---|---|---|
| 4,454,741 A | 6/1984 | Hoogenboom | |
| 5,018,348 A * | 5/1991 | Durschmidt et al. | 60/274 |
| 6,532,659 B1 | 3/2003 | DeSousa et al. | |
| 2003/0010017 A1 | 1/2003 | Myers et al. | |
| 2004/0105792 A1* | 6/2004 | Worner et al. | 422/180 |
| 2004/0159358 A1* | 8/2004 | Bruck | 138/37 |
| 2005/0170957 A1* | 8/2005 | Maus et al. | 502/439 |
| 2005/0214178 A1* | 9/2005 | LaBarge et al. | 422/180 |

* cited by examiner

*Primary Examiner* — Tom Duong
(74) *Attorney, Agent, or Firm* — Butzel Long (57) ABSTRACT

An exhaust treatment device, comprising: a shell portion defining an inlet opening and an outlet opening; at least one catalyst brick being inserted within the shell portion; an insulative material disposed between the shell portion and the at least one catalyst brick; and a sensor receiving area formed in at least one catalyst brick.

13 Claims, 4 Drawing Sheets

EXHAUST TREATMENT DEVICE WITH SENSOR AND METHOD OF MAKING

CROSS REFERENCE TO RELATED APPLICATIONS:

This application claims the benefit of U.S. Provisional Patent Application Ser. No. 60/764,304, filed Feb. 1, 2006, the contents of which are incorporated herein by reference thereto.

BACKGROUND

The present invention relates to exhaust treatment devices. More particularly, the present invention relates to an exhaust treatment device with an exhaust gas sensor.

Oxygen gas sensors or exhaust gas sensors have been used in vehicles to sense the presence of constituents (e.g., oxygen, hydrocarbons, nitrous oxides, etc.) in an exhaust gas flow and to sense and/or signal, for example, when an internal combustion engine switches from rich to lean or lean to rich operation or when a catalyst of the exhaust treatment device is no longer operating within a desired range.

Because exhaust gas sensors are required to be positioned within an exhaust gas flow, the exhaust gas sensor is usually mounted to a portion of the exhaust system. Furthermore and due to application requirements, the exhaust system itself will have unique exterior configurations, which may not be optimal mounting locations for exhaust sensors (e.g., irregular welding surfaces). Accordingly, exhaust system designs limit the positioning and configuration of the gas sensor within the exhaust system. For example and in one application, a pre-fabricated mounting boss is secured to the exhaust system by an attachment method wherein the boss is inserted into or about a hole pierced in an end cone of the exhaust system and the boss is welded to the end cone using metal inert gas (MIG) welding or projection welding. In addition, the exhaust treatment device will typically have insulated catalyst bricks that are disposed within the housing. The catalyst bricks are wrapped in an insulative blanket (mat) disposed between the exterior of the catalyst brick and the interior surface of the exhaust treatment device. In addition, it is also desirable to monitor the gases flowing through the catalyst bricks and to monitor the gas composition between the bricks. However, this requires a sufficient amount of free space between the bricks for the sensing element of the gas sensor to be mounted within the flow path of and between the catalyst bricks (e.g., mid-stream mounting).

Accordingly, it is desirable to provide a catalytic converter with a gas sensor mounted within the catalyst bricks in order to monitor the gases flowing therethrough.

SUMMARY OF THE INVENTION

Exemplary embodiments of the present invention relate to the incorporation of a mid-bed oxygen sensor into an internally insulated catalytic converter or exhaust treatment device with butted catalyst bricks or a single brick with one or more washcoatings. Exemplary embodiments of the present invention are directed to a single or butted brick arrangement, wherein a single brick arrangement will have a receiving area for a portion of the gas sensor disposed in it and if two bricks are used, the ends of the two bricks will be butted to each other and a receiving area for a portion of the gas sensor is disposed in at least one of the catalyst bricks butted against each other. This single or butted brick arrangement offers substantial cost, performance, reliability, and manufacturing advantages over using non-butted (spaced) pair of catalyst bricks.

A method for providing an exhaust treatment device with a mid-mount gas sensor, the method comprising: inserting a first catalyst brick into a shell of the exhaust treatment device; inserting a second catalyst brick into the shell of the exhaust treatment device, wherein an inlet end of the second catalyst is butted against an outlet end of the first catalyst; providing an opening in the shell and a complimentary sensor receiving area in at least one of the first and second catalyst bricks by drilling into the shell after the first and second catalyst bricks have been inserted therein.

An exhaust treatment device, comprising: a shell portion defining an inlet opening and an outlet opening; a pair of catalyst bricks inserted within the shell portion; an insulative mat material disposed between the shell portion and the pair of catalyst bricks; and a sensor receiving area formed in at least one of the pair of catalyst bricks.

In another exemplary embodiment an exhaust treatment device is provided, the exhaust treatment device comprising: a shell portion defining an inlet opening and an outlet opening; at least one catalyst brick inserted within the shell portion; an insulative material disposed between the shell portion and the at least one catalyst brick; and a sensor receiving area formed in at least one catalyst brick.

In another exemplary embodiment, a method for providing an exhaust treatment device with a mid-mount gas sensor is provided, the method comprising: coating a first portion of a catalyst brick with a first washcoat comprising a first catalyst; coating a second portion of the catalyst brick with a second washcoat comprising a second catalyst, the first catalyst being different from the second catalyst; inserting the catalyst brick into a shell of the exhaust treatment device; providing an opening in the shell and a complimentary sensor receiving area in the catalyst brick by drilling into the shell and the catalyst brick after the catalyst brick has been inserted in the shell, the sensor receiving area being located in an area of the catalyst brick where the first portion coated with the first washcoat ends and the second portion with the second washcoat begins.

DETAILED DESCRIPTION OF EXEMPLARY EMBODIMENTS

Reference is made to U.S. patent application Ser. No. 09/903,983, filed Jul. 12, 2001, the contents of which are incorporated herein by reference thereto.

Exemplary embodiments of the present invention relate to an exhaust system comprising a gas sensor mounting boss integrally formed in a shell portion of a catalytic converter of the exhaust system, wherein the gas sensor mounting boss is formed in a location that corresponds to an area disposed within a portion of at least one of the catalyst bricks disposed within the shell or housing of the catalytic converter. In accordance with an exemplary embodiment, the gas sensor can be any conventional sensor such as oxygen sensors currently used in vehicle exhaust systems.

Exemplary embodiments of the present invention relate to the incorporation of a mid-bed oxygen sensor or any other type of sensor into an internally insulated catalytic converter or exhaust treatment device with single or butted catalyst bricks. Exemplary embodiments of the present invention are directed to a single brick or butted brick arrangement wherein the ends of two bricks are butted to each other. These brick arrangements offer substantial cost, performance, reliability, and manufacturing advantages over using non-butted (spaced) catalyst bricks.

Figure 1:
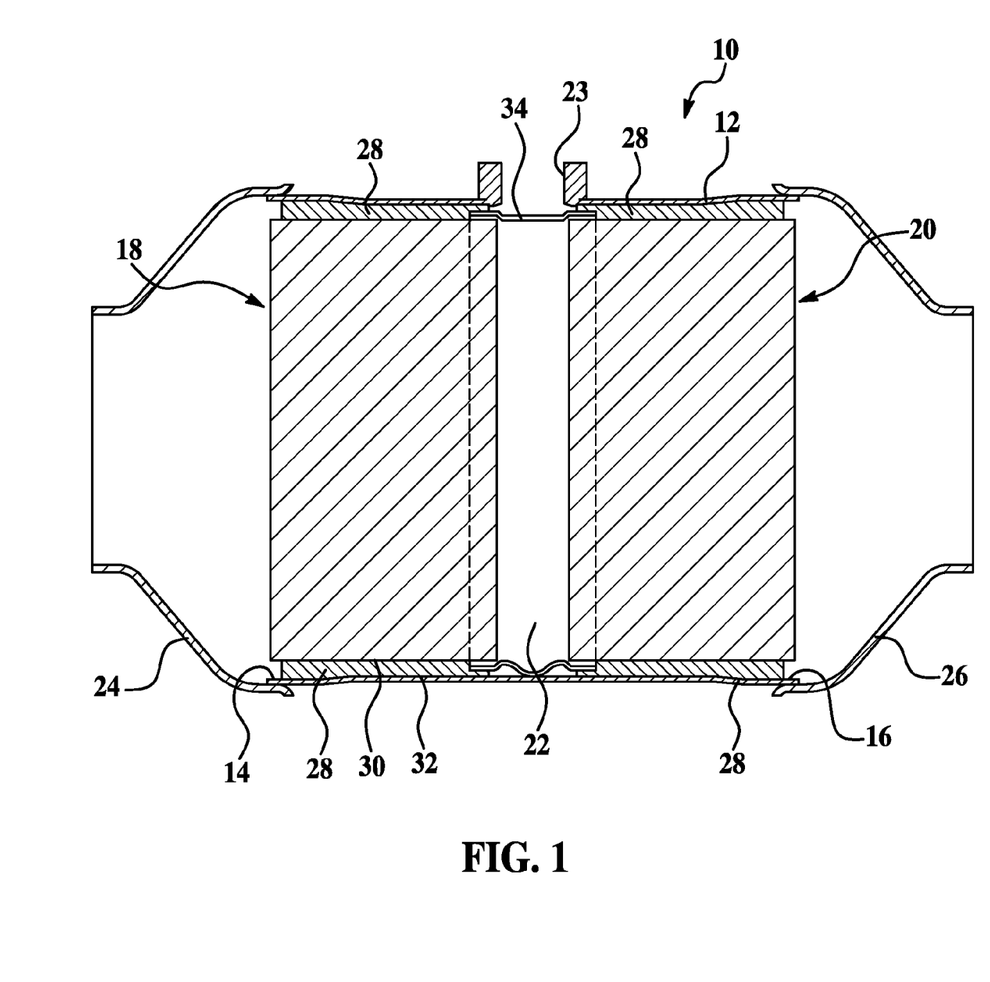
FIG. 1 is a schematic illustration of a catalytic converter.

For example and referring now to FIG. 1, non-butted spaced catalyst bricks are illustrated. Here a catalytic converter with a mid-bed oxygen sensor is located at the outlet end of a first catalyst brick and before the inlet of a second catalyst brick wherein the pair of non-butted (spaced) bricks are positioned in a facing spaced relationship within the housing to provide a clearance or area for installing the oxygen sensor between the front and rear bricks. An example of this arrangement is illustrated in FIG. 1. As illustrated, a catalytic converter or exhaust treatment device (e.g., diesel particulate filter, NOx abatement device, catalytic converter and equivalents thereof) 10 is provided with an outer shell or housing 12. Housing 12 is configured to have an inlet end 14 and an outlet end 16. Proximate to the inlet end is a first or front catalyst brick 18 and spaced therefrom is a second or rear catalyst brick 20. Accordingly, a gap 22 is provided between each of the bricks wherein a gas sensor (not shown) is secured within a threaded opening 23 located proximate to the gap.

In accordance with an exemplary embodiment each catalyst brick is formed by an extrusion process wherein a plurality of fluid paths are disposed therein one non-limiting configuration is a honeycomb substrate often referred to as a "catalyst brick". Thereafter, a washcoat is applied to the surfaces of the catalyst bricks in accordance with processes know to those skilled in the related arts wherein a catalyst such as palladium or other suitable catalyst is disposed on the surface of the catalyst bricks. Also shown in FIG. 1 is a first end cone 24 and a second end cone 26, each of which is secured to the housing after the first and second catalyst bricks are positioned in the outer housing. Also shown in FIG. 1 is an intumescent or non-intumescent mat 28, which is wrapped around an exterior surface 30 of the catalyst bricks and an interior surface 32 of the outer housing.

The bricks and housing are assembled together using a sized to fit or a stuffing process wherein the catalyst brick is wrapped with the intumescent or non-intumescent mat and inserted within the housing. In order to provide the gap illustrated in FIG. 1, each brick is inserted from either end of the housing wherein a ring or spacer 34 is inserted within the housing to provide the gap illustrated in FIG. 1. However, this assembly process requires insulation to be installed between the internal ring and the shell as there typically is no insulation (e.g., intumescent or non-intumescent mat) disposed between the housing and the ring. Accordingly, this construction method adds significant cost and manufacturing difficulties.

In accordance with an exemplary embodiment, a butted brick design is provided wherein at least one of the bricks is machined or formed (e.g., drilled or cut to provide a receiving area for the gas sensor). The butted brick design offers improved performance over the non-butted design illustrated in FIG. 1, while reducing component and manufacturing cost.

In accordance with exemplary embodiments of the present invention the butted bricks are manufactured to provide the necessary clearance for a mid-bed oxygen sensor by creating a pocket or cavity in the catalyst volume to accept the oxygen sensor. This cavity can either be machined into the catalyst after it is stuffed or machined or formed into the catalyst or substrate before stuffing. In an alternative embodiment, the catalyst bricks are machined prior to the washcoat being applied. Accordingly, the required gap between non-butted bricks is eliminated for a mid bed sensor placement. In accordance with exemplary embodiments of the present invention, an oxygen sensor bushing is welded onto or formed into the shell either prior to or after stuffing. In accordance with an exemplary embodiment, the cavity can be formed into the front brick or the rear brick or a combination of the two.

Figure 2:
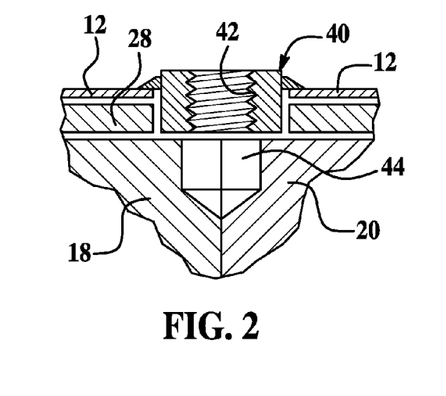
FIG. 2 is a cross sectional view of a portion of an exhaust treatment device constructed in accordance with an exemplary embodiment of the present invention.

These features and methods are illustrated in FIGS. 2-14, wherein portions of exemplary embodiments of the present invention are illustrated. Referring now to FIG. 2, a portion of outer shell or housing 12, first catalyst brick 18, second catalyst brick 20 and intumescent or non-intumescent mat 28 is illustrated.

In this embodiment, outer shell 12, intumescent or non-intumescent mat 28 and a portion of first catalyst brick 18 and a portion of a second catalyst brick 20 is drilled after the bricks are inserted within the housing. Thereafter, a standard bushing 40 is secured (e.g., welded) about the openings formed in the outer shell and the intumescent or non-intumescent mat, wherein a threaded opening 42 is aligned with an area 44 formed in the first and second catalyst bricks. As illustrated, a portion of first brick 18 is drilled as well as a portion of second brick 20. In addition, FIG. 2 illustrates a larger opening in the housing and the intumescent or non-intumescent mat, while the opening formed in the first and second bricks are smaller than the openings in the housing and the mat. It should be noted that the bricks may be machined before or after insertion into the housing as well as before or after the application of the washcoat with the catalyst material. In addition, and in accordance with exemplary embodiments of the present invention, the first and second catalyst bricks may each have different types and amounts of catalyst to provide varying exhaust treatment capabilities and the inclusion of a gas sensor disposed between the outlet of the first brick and the inlet of the second brick (e.g., mid mount) in a butted brick design can provide improvements in the monitoring and diagnostic of the exhaust treatment device.

Figure 3:
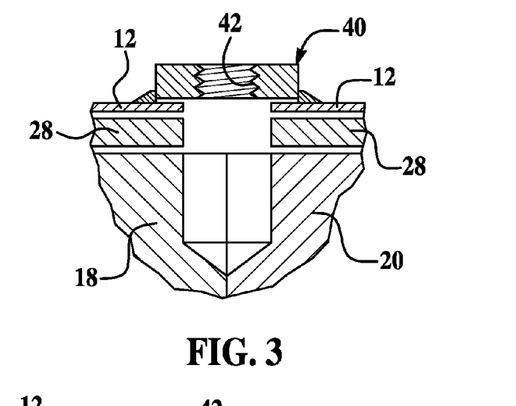
FIG. 3 is a cross sectional view of a portion of an exhaust treatment device constructed in accordance with an alternative exemplary embodiment of the present invention.

Referring now to FIG. 3, the opening formed in the housing and the intumescent or non-intumescent mat has the same diameter of the opening formed by removing portions of the first and second bricks. In this embodiment, the bushing is mounted to the exterior of the housing. Here a thin topside bushing is illustrated. Alternatively, a rigidizer or seal can be applied to the exposed intumescent or non-intumescent mat, if necessary. Again, a rearward portion of the first catalyst brick is removed while a forward portion of the second catalyst brick is removed (e.g., by drilling both bricks 18 and 20 when the openings are drilled in the outer housing and the intumescent or non-intumescent mat). In this embodiment the bushing is welded to the exterior surface of the housing.

Figure 4:
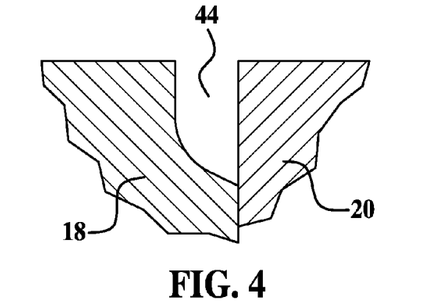
FIG. 4 is a cross sectional view of a portion of an exhaust treatment device constructed in accordance with another alternative exemplary embodiment of the present invention.

Referring now to FIG. 4, the first and second catalyst bricks are shown together wherein only one of the bricks is drilled or machined to provide the gas sensor opening. FIG. 4 shows only the first brick being drilled however, it is understood that either the first or second brick can be predrilled. Exemplary embodiments are directed to drilling, machining or any other equivalent production means for providing the desired area in at least one of the catalyst bricks, which are butted together. In this embodiment, the bricks either the forward or rearward or both are pre-drilled or preformed prior to their installation into the housing wherein the housing is either predrilled, stamped or machined or the housing is stamped or drilled after the first and second bricks are inserted into the housing.

Figure 5:
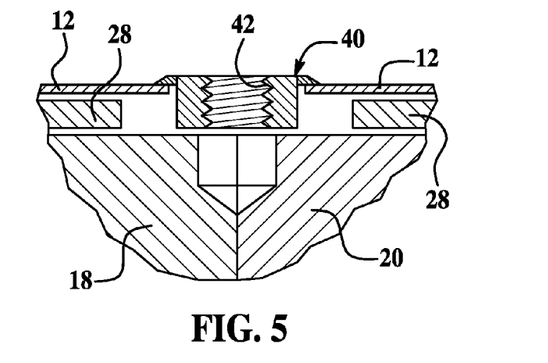
FIG. 5 is a cross sectional view of a portion of an exhaust treatment device constructed in accordance with another alternative exemplary embodiment of the present invention.
Figure 6:
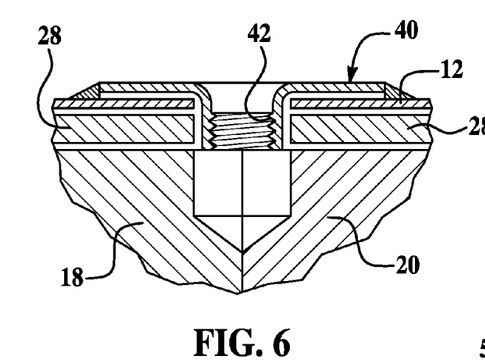
FIG. 6 is a cross sectional view of a portion of an exhaust treatment device constructed in accordance with another alternative exemplary embodiment of the present invention.

For example, and referring now to FIG. 5 a standard bushing is secured to the opening in the housing and the intumescent or non-intumescent mat wherein the opening is pre-punched and the first and second catalyst bricks are pre-drilled. In yet another alternative exemplary embodiment and referring now to FIG. 6, a sheet metal bushing is secured to the outer housing after the first and second catalyst bricks are inserted into the housing from either end.

In yet another alternative and with any of the embodiments of FIGS. 2-6, portions of the bricks are not coated with the washcoat to prevent palladium coated surfaces from being drilled. Accordingly, the manufacturing costs of the brick(s) is/are reduced.

Figure 7:
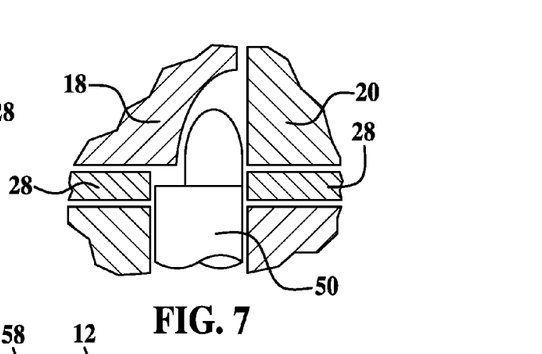
FIGS. 7 and 8 are cross sectional views of devices for forming an exhaust treatment device in accordance with an exemplary embodiment of the present invention.

In another alternative exemplary embodiment and referring now to FIG. 7 an alignment feature device 50 is provided wherein the first and second bricks and the intumescent or non-intumescent mat are aligned by the feature device before the butted bricks and the intumescent or non-intumescent mat are inserted into the housing.

Figure 8:
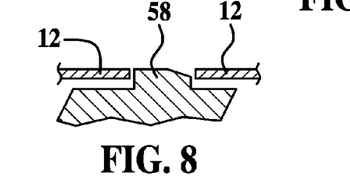

FIG. 8 illustrates a plug device 58 for use with an outer shell or housing is illustrated. In this embodiment, the plug is used to block the opening in the housing before the intumescent or non-intumescent mat and the catalyst bricks are inserted therein.

Figure 9:
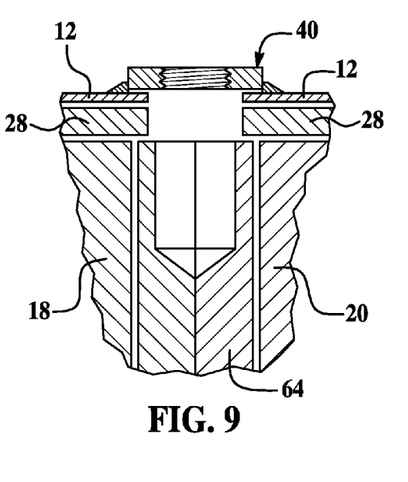
FIGS. 9-14 are cross-sectional views of portions of exhaust treatment devices constructed in accordance with other alternative exemplary embodiments of the present invention.

Referring now to FIG. 9, another alternative exemplary embodiment is illustrated. Here a ceramic spacer block 64 with a plurality of openings or fluid paths is inserted between the first and second bricks and as with any of the previous embodiments the spacer block, the housing and intumescent mat are either drilled together or separately to provide an opening or area for the gas sensor to be inserted therein. In this embodiment, the ceramic spacer block or a portion thereof is not provided with a washcoat thus, drilling of a palladium coated brick is negated thus eliminating any waste of palladium coated ceramic material. Again, and as illustrated in the previous embodiments, a bushing is welded to the exterior of the housing shell.

Figure 10:
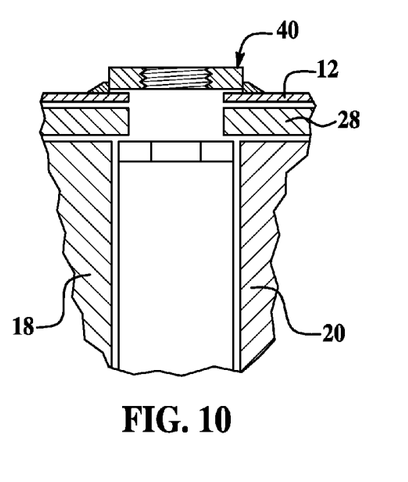
Figure 11:
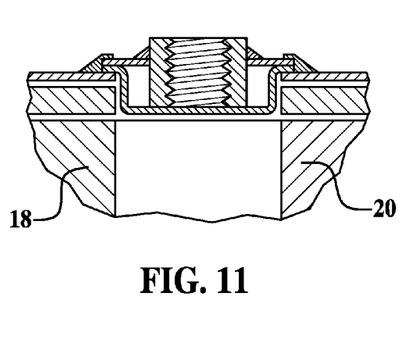
Figure 12:
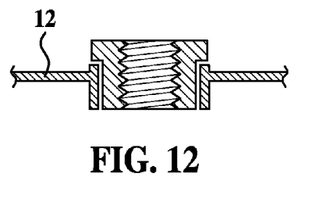
Figure 13:
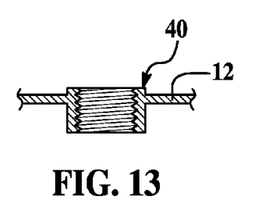
Figure 14:
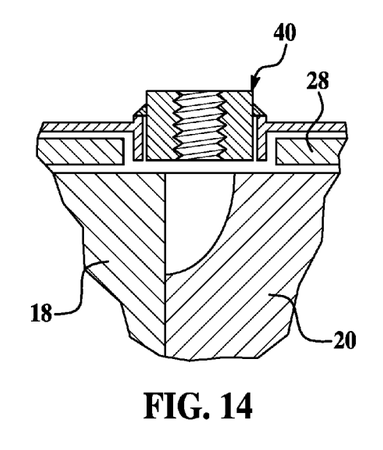

Alternatively, and referring now to FIG. 10 a ceramic spacer ring 70 is located within the housing prior to the insertion of the bricks into the housing. In this embodiment, the bushing is mounted to the exterior of the housing.

Alternative methods for securing the bushing to the housing include friction welding, friction welding of a bushing, flow drilling of a mounting boss into the housing. Non-limiting embodiments are illustrated in FIGS. 11-14. In addition, the bushing in exemplary embodiments of the present invention is formed by the teachings and methods disclosed in U.S. Provisional Patent Application Ser. No. 60/764,305, filed Feb. 1, 2006 and U.S. patent application Ser. No. 09/903,983, filed Jul. 12, 2001, the contents each of which are incorporated herein by reference thereto.

Figure 15:
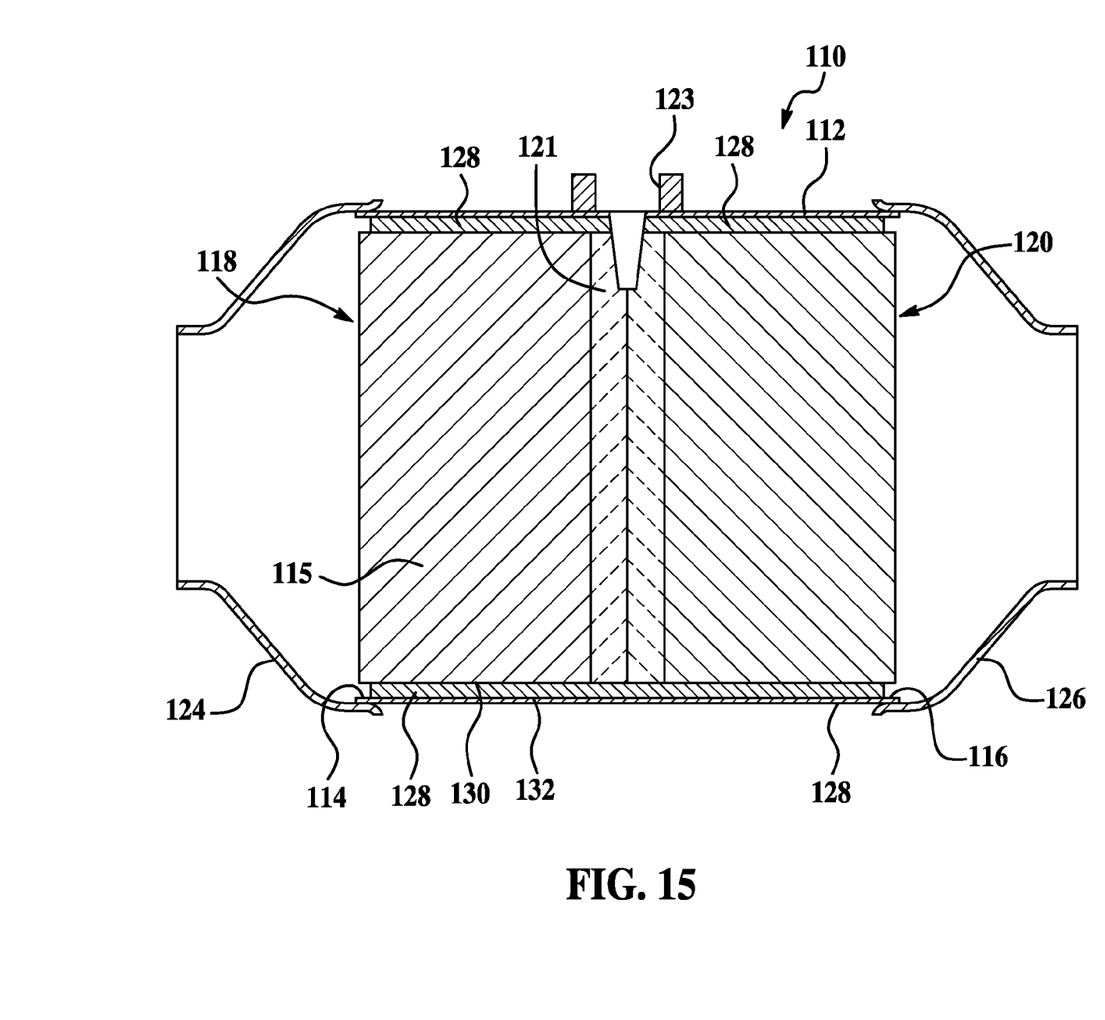
FIG. 15 is a cross sectional view of an exhaust treatment device constructed in accordance with an alternative exemplary embodiment of the present invention.

Referring now to FIG. 15 an alternative exemplary embodiment of the present invention is illustrated. Here a catalytic converter or exhaust treatment device 110 is provided with an outer shell or housing 112. Housing 112 is configured to have an inlet end 114 and an outlet end 116. Inserted within housing 112 is a catalyst brick 115 having a first or front washcoat section 118 and a second or rear washcoat section 120. In accordance with an exemplary embodiment the first washcoat section is coated with a first washcoat comprising a first catalyst and the second washcoat section coated with a second washcoat comprising a second catalyst, the first catalyst being different from the second catalyst. In one exemplary embodiment the first washcoat section is disposed at an inlet of the exhaust treatment device and the first catalyst is configured for optimal performance during initial start up of an engine the exhaust treatment device is secured to thus, start up emissions are reduced by the first catalyst. Moreover, the second catalyst can be optimized to reduced emissions based upon its slower warm up rate as it is further downstream from the initial exhaust inlet. In addition, the brick will have an area 121 where the first washcoat section changes to the second washcoat section.

In accordance with an exemplary embodiment the catalyst brick is formed by an extrusion process wherein a plurality of fluid paths are disposed therein one non-limiting configuration is a honeycomb substrate often referred to as a "catalyst brick". Thereafter, the washcoats are applied to the surfaces of the catalyst bricks in accordance with processes know to those skilled in the related arts wherein a catalyst such as palladium or other suitable catalyst is disposed on the surface of the catalyst bricks.

Also shown in FIG. 15 is a first end cone 124 and a second end cone 126, each of which is secured to the housing after the catalyst brick is positioned in the outer housing. Also shown in FIG. 15 is an intumescent or non-intumescent mat 128, which is disposed between an exterior surface 130 of the catalyst brick and an interior surface 132 of the outer housing.

The brick and the housing are assembled together using a sized to fit or a stuffing process wherein the catalyst brick is wrapped with the intumescent or non-intumescent mat and inserted within the housing.

In accordance with an exemplary embodiment, a portion of the area 121 is machined or formed (e.g., drilled or cut to provide a receiving area for the gas sensor). The receiving area provides the necessary clearance for a mid-bed oxygen sensor by creating a pocket or cavity in the catalyst volume to accept the oxygen or other type of sensor. This cavity can either be machined into the catalyst after it is stuffed or machined or formed into the catalyst or substrate before stuffing. In an alternative embodiment, the catalyst brick are machined prior to the washcoats being applied. In accordance with exemplary embodiments of the present invention, a sensor bushing is welded onto or formed into the shell either prior to or after stuffing.

Methods and features for forming non-limiting sensing bushings are illustrated in FIGS. 2-14 in addition, and in accordance with exemplary embodiments of the present invention, the first and second catalysts of the brick each have different types and amounts of catalyst to provide varying exhaust treatment capabilities and the inclusion of a gas sensor disposed between the outlet of the first washcoat and the inlet of the second washcoat.

In yet another alternative the area 121 of the brick is not coated with a washcoat to prevent palladium coated surfaces from being drilled. Accordingly, the manufacturing costs of the brick(s) is reduced.

In yet another alternative exemplary embodiment, the single brick comprises a single washcoat and the sensor is disposed in a sensor receiving area created in the single brick.

Exemplary embodiments of the present invention are also directed to a shell portion having a threaded gas sensor mounting boss formed therein. In addition, exemplary embodiments of the present invention allow the gas sensor to be mounted to a portion of the catalytic converter where less turbulent gas flows are observed (e.g., within an elongated housing portion as opposed to end cones located at either end of the elongated housing portion).

In accordance with one exemplary embodiment, the gas sensor mounting boss is formed in the outer shell by a form drill process, for example a flow drill operation, wherein a thermal drilling process (e.g., flowdrilling) is used to form a hole and simultaneously produce a bushing from the metal adjacent to which the hole is being formed in. Additional information illustrating this process is found at the following web address: http://www.robertspeck.com/formdp.htm as well as the following U.S. Pat. No. 4,454,741 issued to Hoogenboom, the contents of which are incorporated herein by reference thereto.

In an exemplary embodiment, the gas treatment device is illustrated with a substrate, support, monolith, or brick, which includes a catalyst material coated thereon. A mounting device such as a mat support material comprising an intumescent material, non-intumescent material, or a combination of both, is disposed about the substrate forming a mat support material/substrate subassembly, prior to being inserted into the housing.

One non-limiting method for inserting the mat support material/substrate subassembly into the housing comprises using a stuffing cone and stuffing cone apparatus. An example of one such apparatus and process is described in U.S. Pat. No. 6,532,659, the contents of which are incorporated herein by reference thereto. In this method, the outlet of the stuffing cone, which is disposed adjacent to the inlet of the housing, has an inner diameter less than the inner diameter of the housing. As the mat support material/substrate subassembly moves through the stuffing cone toward the housing, the stuffing cone compress the mat support material about the substrate so that the subassembly can be disposed into the housing. More particularly, as the mat support material/substrate subassembly slides against the inwardly tapered interior of the stuffing cone, the mat support material compresses about the substrate until the mat support material substrate subassembly has an outer diameter less than the housing outer diameter. At this point, the mat support material/substrate subassembly is pushed into the housing.

Generally, the stuffing cone's diameter is less than the diameter of the smallest housing to be stuffed using that particular stuffing cone to ensure the subassembly is sufficiently compressed to be inserted into the housing.

In one non-limiting embodiment, the stuffing cone apparatus comprises a funnel, a pusher detail and a retainer detail. The funnel comprises a conduit with an interior tapered inwardly from a first end toward an opposing second end. The first end comprises a diameter large enough to accept a mat support material/substrate subassembly. The opposing second end comprises a diameter that is less than or equal to the internal diameter of the main body of a housing, which is used to house the mat support material/substrate subassembly after placement therein by the stuffing cone apparatus. Optionally, the second end can comprise a portion having a substantially consistent diameter (e.g., a cylindrical portion, or the like). Additionally, the funnel preferably comprises a locating cavity disposed towards the second end of the funnel for the placement of the housing.

The funnel can possess a cross-sectional geometry such as rounded (e.g., round, oval, elliptical, irregular, and the like), polygonal (e.g., triangular, square, trapezoidal, pentagonal, hexagonal, heptagonal, octagonal, and the like, as well as combinations comprising at least one of the foregoing polygonal shapes), and the like, as well as combinations comprising at least one of the foregoing geometries. With respect to the overall shape, it can be a hollow, elongated geometry capable of receiving the subassembly, compressing the mat support about the substrate as the subassembly moves through the stuffing cone, and introducing the compressed subassembly to the housing. Some possible overall geometries include cylindrical, tubular, conical, and the like, with a truncated conical shape, or a combination of conical and cylindrical shapes preferred.

The stuffing cone apparatus can be employed with numerous types and designs of substrates, mat support materials, and housings. For example, the substrate can comprise any material designed for use in a spark ignition or diesel engine environment, and which has the following characteristics: (1) capable of operating at temperatures up to, and exceeding, about 1,000° C. (depending upon the location of the treatment device; e.g., under-floor, close coupled, in the manifold, and the like); (2) capable of withstanding exposure to hydrocarbons, nitrogen oxides, carbon monoxide, carbon dioxide, sulfur, particulates, and/or sulfur oxides; and, if desired, (3) having sufficient surface area and structural integrity to support the desired catalyst. Some possible materials include cordierite, silicon carbide, metal, metal oxides (e.g., alumina, and the like), glasses, and the like, and combinations comprising at least one of the foregoing materials. Some ceramic materials include "HONEY CERAM", commercially available from NGK-Locke, Inc, Southfield, Mich., and "CELCOR", commercially available from Corning, Inc., Corning, N.Y. These materials can be in the form of foils, porous structures (e.g., porous glasses, sponges), monoliths (e.g., a honeycomb structure, and the like), and the like, as well as combinations comprising at least one of the foregoing forms.

Disposed on and/or throughout the substrate is optionally a catalyst capable of reducing the concentration of at least one component in the gas. The catalyst may comprise one or more catalyst materials that are washcoated, imbibed, impregnated, physisorbed, chemisorbed, precipitated, or otherwise applied to the catalyst substrate. Possible catalyst materials include metals, such as platinum, palladium, rhodium, iridium, osmium, ruthenium, tantalum, zirconium, yttrium, cerium, nickel, copper, and the like, as well as oxides, alloys, and combinations comprising at least one of the foregoing catalyst materials, and other catalysts.

Disposed around the substrate is the mat support material that can comprise an intumescent material (e.g., comprising a vermiculite component), a nonintumescent material, or combinations thereof. The intumescent material, for example, is one which comprises ceramic materials, and other materials such as organic binders and the like, or combinations comprising at least one of the foregoing materials. The vermiculite component is a component that expands with heating to maintain firm uniform compression, or non-uniform compression, if desired. The non-intumescent material, for example, is one that does not contain vermiculite. Non-intumescent materials include materials such as 900HT, 1100HT, and those sold under the trademarks "NEXTEL" and "SAF- FIL" by the "3M" Company, Minneapolis, Minn., or those sold under the trademark, "FIBERFRAX" and "CC-MAX" by the Unifrax Co., Niagara Falls, N.Y., and the like. Intumescent materials include materials, sold under the trademark "INTERAM" by the "3M" Company, Minneapolis, Minn., such as Interam 100, as well as those intumescents which are also sold under the aforementioned "FIBERFRAX" trademark by the Unifrax Co., Niagara Falls, N.Y., as well as combinations comprising at least one of the foregoing materials, and others.

Additionally, the housing can be any material and design appropriate for use with the particular substrate geometry, size, and material. The housing is preferably designed to receive the mat support material/substrate subassembly and withstand the particular operating condition (e.g., close coupled, under floor, and the like). Due to the flexibility and structural integrity provided by the dual details (pusher and retainer), non-symmetrical, complex, cross-sectional geometries may be employed. Additionally, several substrates can be employed. For example, several substrates can replace a single substrate, thereby enabling the use of different substrate and/or catalyst material in different areas of the housing.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application

What is claimed is:

1. An exhaust treatment device, comprising:
a shell portion defining an inlet opening and an outlet opening;
a pair of catalyst bricks inserted within the shell portion;
an insulative material disposed between the shell portion and the pair of catalyst bricks; and
an area formed in at least one of the pair of catalyst bricks dimensioned to receive therein at least a portion of the body of a sensor,
wherein the pair of catalyst bricks each have an inlet end and an outlet end, and the inlet end of one of the bricks is butted against the outlet end of the other one of the pair of catalyst bricks, and the area is formed in the inlet end and the outlet end of the bricks butted against each other.

2. The exhaust treatment device as in claim 1, wherein a sensor mounting boss is secured to the shell portion proximate to the area.

3. The exhaust treatment device as in claim 1, wherein an opening is formed in the shell portion proximate to the sensor receiving area, and a sensor mounting boss is secured about the opening in the shell portion.

4. The exhaust treatment device as in claim 1, wherein a sensor mounting boss is formed in the shell portion proximate to the area via a flow drilling process.

5. The exhaust treatment device as in claim 1, wherein one of the pair of catalyst bricks is coated with a washcoat comprising a first catalyst, the other one of the pair of catalyst bricks is coated with a washcoat comprising a second catalyst that is different from the first catalyst.

6. An exhaust treatment device, comprising:
a shell portion defining an inlet opening and an outlet opening;
a pair of catalyst bricks inserted within the shell portion;
an insulative material disposed between the shell portion and the air of catalyst bricks; and
an area formed in at least one of the pair of catalyst bricks dimensioned to receive therein at least a portion of the body of a sensor, wherein the pair of catalyst bricks each have an inlet end and an outlet end, and the inlet end of one of the bricks is butted against the outlet end of the other one of the pair of catalyst bricks, the area is formed in either the inlet end or the outlet end of the bricks butted against each other, and a plug device is used to position the pair of catalyst bricks with a sensor opening in the shell portion.

7. The exhaust treatment device as in claim 6, wherein the pair of catalyst bricks are coated with a washcoat comprising a catalyst.

8. An exhaust treatment device, comprising:
a shell portion defining an inlet opening and an outlet opening;
a pair of catalyst bricks inserted within the shell portion;
an insulative material disposed between the shell portion and the pair of catalyst bricks; and
an area formed in at least one of the pair of catalyst bricks dimensioned to receive therein at least a portion of the body of a sensor, wherein the pair of catalyst bricks each have an inlet end and an outlet end, and wherein further the inlet end of one of the bricks is spaced from the outlet end of the other one of the pair of catalyst bricks and disposed therebetween is a ceramic brick.

9. An exhaust treatment device, comprising:
a shell portion defining an inlet opening and an outlet opening;
at least one catalyst brick inserted within the shell portion;
an insulative material disposed between the shell portion and the at least one catalyst brick;
an area formed in the at least one catalyst brick dimensioned to receive therein at least a portion of the body of a sensor; and
wherein the at least one catalyst brick has a first washcoat section coated with a first washcoat comprising a first catalyst and a second washcoat section coated with a second washcoat comprising a second catalyst, the first catalyst being different from the second catalyst, and the sensor receiving area is formed in an area of the at least one catalyst brick where the first washcoat section changes to the second washcoat section.

10. The exhaust treatment device as in claim 9, wherein a sensor mounting boss is secured to the shell portion proximate to the area.

11. The exhaust treatment device as in claim 9, wherein a sensor mounting boss is formed in the shell portion proximate to the area via a flow drilling process.

12. The exhaust treatment device as in claim 9, wherein an opening is formed in the shell portion proximate to the area and a sensor mounting boss is secured about the opening in the shell portion.

13. An exhaust treatment device, comprising:
a shell portion defining an inlet opening and an outlet opening;
a pair of catalyst bricks inserted within the shell portion, one of the pair of catalyst bricks is coated with a washcoat comprising a first catalyst and the other one of the pair of catalyst bricks is coated with a washcoat comprising a second catalyst, the second catalyst being different from the first catalyst;
a ceramic spacer disposed between the catalyst bricks;
insulative material disposed between the shell portion and the pair of catalyst bricks; and
an area formed in the ceramic spacer dimensioned to receive therein at least a portion of the body of a sensor, wherein the pair of catalyst bricks each have an inlet end and an outlet end, and the inlet end of one of the bricks is butted against the outlet end of the other one of the pair of catalyst bricks, and the area is formed in the inlet end and the outlet end of the bricks butted against each other.

* * * * *